United States Patent Office

2,864,754
Patented Dec. 16, 1958

2,864,754

PREPARATION OF TETRABORANE

Joseph P. Nigon, Evans City, Pa., assignor to Callery Chemical Company, Pittsburgh, Pa., a corporation of Pennsylvania No Drawing. Application May 3, 1954
Serial No. 427,349

6 Claims. (Cl. 204—164)

This invention relates to a new and improved method for the preparation of tetraborane ($B_4H_{10}$) and more particularly to a new and improved method for preparing tetraborane in substantial yields from diborane using a silent electric discharge.

Tetraborane has received considerable attention in recent years because of its high heat of combustion which makes it valuable as a high energy fuel. It is also useful as a fuel additive and as an intermediate in the preparation of other boron containing high energy fuels. Several methods for producing tetraborane have been developed none of which are entirely satisfactory. Alfred Stock first prepared tetraborne by the acid hydrolysis of a metal boride. Later, he used a Wurtz type reaction utilizing sodium amalgam. A more recent method of preparation involves the reaction of $B_2Cl_4$ with a metal borohydride in the absence of solvents.

It is one of the objects of this invention to provide a new and improved method for the preparation of tetraborane ($B_4H_{10}$) in substantial yields from diborane ($B_2H_6$) using a silent electric discharge.

Another object is to provide a method of treating diborane in a silent electric discharge chamber under conditions of temperature and pressure which favor the formation of tetraborane rather than other higher boranes.

Other objects of this invention will become apparent from time to time throughout the specification and claims as hereinafter related.

This process will be described more fully hereinafter and the novelty thereof will be particularly pointed out and distinctly claimed.

In this invention diborane ($B_2H_6$) is circulated through a silent electric discharge chamber at temperatures and pressures favoring the formation of tetraborane ($B_4H_{10}$). The tetraborane formed is separated from the by-products by any suitable means and the unchanged diborane is recirculated to form more tetraborane.

In one experiment, diborane was circulated through a chamber subjected to a silent electric discharge at 15,000 volts for 4 hours. The temperature in the discharge chamber was maintained at 0° C. and the diborane pressure in the chamber was maintained at 225 mm. The hydrogen formed was removed periodically and the unconverted diborane was recirculated several times. The tetraborane formed was separated by fractional distillation and was identified by molecular weight and vapor pressure measurements. Approximately 44 percent of the diborane was converted to higher boranes of which 38 percent was tetraborane, 4 percent was pentaborane and 2 percent was non-volatile yellow higher boranes. Thus, 86 percent of the diborane converted to higher boranes was recovered as tetraborane.

The temperature and pressure conditions of this process were studied to determine the conditions most important for good yields. In general, the highest yields are obtained at a temperature of —25° C. to +15° C. and a diborane pressure of 180–250 mm. Experiments which were carried out show that outside these ranges of temperature and pressure the yield of tetraborane decreases markedly.

In one series of experiments in which diborane was circulated through a chamber subjected to a silent electric discharge at 15,000 volts, the pressure was maintained at approximately 225 mm. and the temperature was varied with the following results:

| Temp., ° C | Time, Hrs. | Percent $B_4H_{10}$ | Percent $B_5H_8$ | Percent Non-Volatile | Percent Yield $B_4H_{10}$ (based on $B_2H_6$ converted) |
|---|---|---|---|---|---|
| 0 | 4 | 38 | 4 | 2 | 86.3 |
| —25 | 3 | 40 | 2 | 28 | 57.1 |
| —35 | 5½ | 11 | 15 | 29 | 20.0 |
| —80 | 3 | None | None | None | |

In this series of experiments the circulation of diborane was effected by manually changing a liquid nitrogen trap from one side of the apparatus to the other and the by-product hydrogen was periodically pumped off. It is apparent from the data obtained that the best yield of tetraborane is obtained at a temperature of about 0° C. Other experimental data indicates that the conversion of diborane to higher boranes in the silent electric discharge falls off markedly at higher temperatures.

In another series of experiments, the diborane was circulated through a silent electric discharge chamber using a peristaltic pump. The temperature was maintained at 0° C. and the pressure was varied as follows:

| Press. (mm.) | Time (Hrs.) | Percent $B_4H_{10}$ | Percent $B_5H_8$ | Percent Non-Volatile | Percent Yield $B_4H_{10}$ (Based on $B_2H_6$ converted) |
|---|---|---|---|---|---|
| 68 | 4 | 5.4 | 8.4 | 6.2 | 27.0 |
| 140 | 3½ | 7.4 | 7.0 | 15.8 | 24.5 |
| 225 | 4 | 7.2 | 0.1 | 1.7 | 80.0 |
| 645 | 4½ | None | None | None | |

This data indicates that substantial yields of tetraborane are obtained at pressures of 180–250 mm. It should again be noted that in the first series of experiments reported, the hydrogen formed was removed after each pass of the diborane through the discharge chamber so that only diborane was recirculated and thus the contact time in the chamber was of longer duration. In the second series of experiments, the diborane was progressively diluted with the hydrogen formed which reduced the contact time in the chamber and reduced the percentage of conversion to tetraborane.

When inert gases (group O) such as helium or argon are used to dilute the diborane the operation of the silent electric discharge is improved due to the action of such gases as a conductor for the discharge. This advantage does not occur, however, when hydrogen or nitrogen is used for the same purpose.

While serveral embodiments of this invention have been described it is to be understood that within the scope of the claims appended hereto this invention may be practiced otherwise than as specifically described.

Having thus described this invention and the manner in which it is to be performed, what is desired to be claimed and secured by Letters Patent of the United States is:

1. A method of preparing tetraborane ($B_4H_{10}$) which comprises subjecting diborane to a silent electric discharge at a pressure from 180 to 250 mm. and a temperature of —25° C. to +15° C. and recovering the tetraborane formed.

2. A method according to claim 1 in which the diborane is subjected to a silent electric discharge in admixture with a small amount of an inert gas.

3. A method according to claim 1 in which the diborane is continuously circulated through the discharge and the by-product hydrogen is removed therefrom.

4. A method of preparing tetraborane which comprises subjecting diborane to a silent electric discharge at a temperature of 0° C. and a pressure of 225 mm. and recovering the tetraborane thus formed.

5. A method according to claim 4 in which the diborane is subjected to a silent electric discharge in admixture with a small amount of an inert gas.

6. A method according to claim 5 in which the diborane is continuously circulated through the discharge and the by-product hydrogen is removed therefrom.

References Cited in the file of this patent

Schlesinger et al.: Jour. Am. Chem. Soc., vol. 53, pp. 4321–4332 (1931).

Stock et al.: Berichte, volume 69B, pages 1469–1475 (1936).

UNITED STATES PATENT OFFICE
CERTIFICATE OF CORRECTION

Patent No. 2,864,754                                      December 16, 1958

Joseph P. Nigon

It is hereby certified that error appears in the printed specification of the above numbered patent requiring correction and that the said Letters Patent should read as corrected below.

Column 2, approximately lines 10 and 11, and lines 33 and 34, in the heading to each table, fourth column thereof, for "Percent", each occurrence, read -- Percent --.
    $B_5H_8$                                      $B_5H_9$ Signed and sealed this 14th day of April 1959.

(SEAL)
Attest:

KARL H. AXLINE                                            ROBERT C. WATSON
Attesting Officer                                          Commissioner of Patents